US012809297B2

(12) United States Patent
Fujii et al.

(10) Patent No.: US 12,809,297 B2
(45) Date of Patent: Nov. 24, 2026

(54) FIXING DEVICE INCLUDING TEMPERATURE DETECTION PART FOR DETECTING TEMPERATURE OF HEATER AND IMAGE FORMING APPARATUS

(71) Applicant: KYOCERA Document Solutions Inc., Osaka (JP)

(72) Inventors: Shunsaku Fujii, Osaka (JP); Ryohei Tokunaga, Osaka (JP); Akihiro Kondo, Osaka (JP); Yuta Kitabayashi, Osaka (JP); Hiroki Kawasaki, Osaka (JP); Yuto Masaoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/097,411

(22) Filed: Apr. 1, 2025

(65) Prior Publication Data

US 2025/0321527 A1 Oct. 16, 2025

(30) Foreign Application Priority Data

Apr. 12, 2024 (JP) ................................ 2024-064539

(51) Int. Cl.
*G03G 15/20* (2006.01)
*G03G 15/00* (2006.01)

(52) U.S. Cl.
CPC ......... *G03G 15/55* (2013.01); *G03G 15/2017* (2013.01); *G03G 15/2064* (2013.01)

(58) Field of Classification Search
CPC .......... G03G 15/2017; G03G 15/2042; G03G 15/2053; G03G 15/2064; G03G 15/55
See application file for complete search history.

(56) References Cited

U.S. PATENT DOCUMENTS

| | | | | |
|---|---|---|---|---|
| 9,501,012 | B2 | 11/2016 | Ogawa et al. | |
| 10,095,165 | B2 | 10/2018 | Ogawa et al. | |
| 10,564,579 | B2 | 2/2020 | Ogawa et al. | |
| 11,609,517 | B1 * | 3/2023 | Sone .................. | G03G 15/2053 |
| 2022/0066366 | A1 * | 3/2022 | Watanabe .......... | G03G 15/2053 |
| 2025/0189915 | A1 * | 6/2025 | Matsumoto ........ | G03G 15/2053 |

FOREIGN PATENT DOCUMENTS

JP 2016-095433 A 5/2016

* cited by examiner

*Primary Examiner* — Hoang X Ngo
(74) *Attorney, Agent, or Firm* — Studebaker Brackett PLLC

(57) ABSTRACT

A fixing device includes a fixing belt, a pressing roller, a heater, a heat equalizing member and a temperature detection part. The heater comes into contact with an inner surface of the fixing belt facing the pressure region, and heats the fixing belt. The heat equalizing member extends in the axial direction, and comes into contact with one surface of the heater opposite to the fixing belt. The temperature detection part is in contact with one surface of the heat equalizing member opposite to the heater and detects a temperature of the heater via the heat equalizing member. At least one of end portions of the heater and the heat equalizing member in the axial direction is exposed to an outside of the fixing belt. The temperature detection part is provided in contact with the heat equalizing member exposed from the fixing belt.

4 Claims, 6 Drawing Sheets

FIXING DEVICE INCLUDING TEMPERATURE DETECTION PART FOR DETECTING TEMPERATURE OF HEATER AND IMAGE FORMING APPARATUS

INCORPORATION BY REFERENCE

This application is based on and claims the benefit of priority from Japanese patent application No. 2024-064539 filed on Apr. 12, 2024, which is incorporated by reference in its entirety.

BACKGROUND

The present disclosure relates to a fixing device which fixes a toner image to a medium and an image forming apparatus.

An electrophotographic image forming apparatus includes a fixing device for thermally fixing toner on a recording material (medium). For example, the fixing device includes a cylindrical film, a heater in contact with the inner surface of the film, a metal plate in contact with the heater, and a thermistor in contact with the metal plate. The thermistor is provided in a space surrounded by the film, corresponding to the vicinity of the center of the heating region of the heater, and detects a temperature of the heater through the metal plate.

However, in the above-described fixing device, since the thermistor (a temperature detection part) is disposed in the space surrounded by the film (a fixing belt), a diameter (outer diameter) of the film tends to be large (curvature is small), and the fixing device becomes large. In the fixing device described above, since the thermistor is wrapped in the film, it is easily affected by a temperature of the space in the film, and there is a possibility that a proper temperature of the heater cannot be detected.

SUMMARY

A fixing device according to the prese t disclosure includes a fixing belt, a pressing roller, a heater, a heat equalizing member and a temperature detection part. The fixing belt is formed in a cylindrical shape and rotates around an axis to heat a toner on a medium. The pressing member forms a pressure region with the fixing belt and pressurizing the toner on the medium passing through the pressure region while rotating around an axis. The heater extends in the axial direction of the fixing belt, comes into contact with an inner surface of the fixing belt facing the pressure region, and heats the fixing belt. The heat equalizing member extends in the axial direction, comes into contact with one surface of the heater opposite to the fixing belt, absorbs heat emitted from the heater and moving the heat in the axial direction. The temperature detection part is in contact with one surface of the heat equalizing member opposite to the heater and detects a temperature of the heater via the heat equalizing member. At least one of end portions of the heater and the heat equalizing member in the axial direction is exposed to an outside of the fixing belt in the axial direction. The temperature detection part is provided in contact with the heat equalizing member exposed from the fixing belt.

An image forming apparatus according to the present disclosure includes the fixing device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
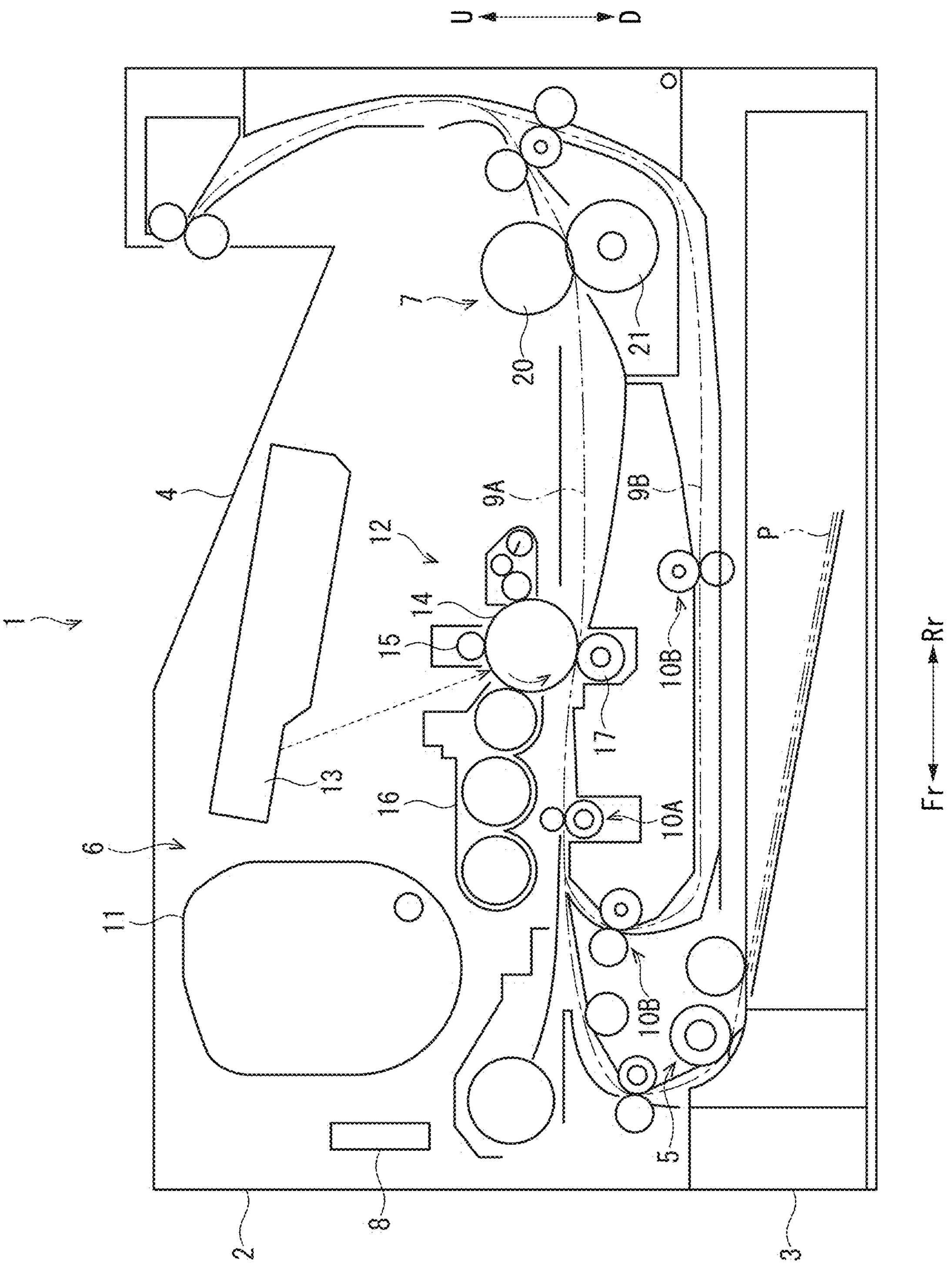
FIG. 1 is a schematic view (side view) showing an internal structure of an image forming apparatus according to one embodiment of the present disclosure.

Hereinafter, with the attached drawings, embodiments of the present disclosure will be described. Fr, Rr, L, R, U and D shown in the drawings indicate the front, rear, left, right, upper and lower. The front-and-rear direction, the left-and-right direction (axial direction) and the upper-and-lower direction are orthogonal to each other. Although terms showing directions and positions are used herein, these terms are used for convenience of description and do not limit the technical scope of the present disclosure. The terms "upstream", "downstream" and the like refer to the "upstream", "downstream" and the like in the passing direction (conveyance direction) of the paper P (medium). In each of the figures, the dimensions and angles of the members are not accurate and are schematized for the sake of illustration.

With reference to FIG. 1, the image forming apparatus 1 according to the embodiment will be described. FIG. 1 is a schematic view (side view) showing the image forming apparatus 1.

The image forming apparatus 1 is an electrophotographic printer. The image forming apparatus 1 is provided with an apparatus main body 2 constituting a substantially rectangular parallelepiped appearance. In the lower portion in the apparatus main body 2, a paper feeding cassette 3 in which a paper P (medium) is stored is detachably provided. On the upper surface of the apparatus main body 2, a paper discharge tray 4 is provided. The paper P as an example of the medium is not limited to a paper but may be a resin sheet or the like.

The image forming apparatus 1 includes a paper feeding device 5, an image forming device 6, and a fixing device 7. The paper feeding device 5 is provided at the upstream end of a conveyance path 9A extending from the paper feeding cassette 3 to the paper discharge tray 4, and feeds the paper P stored in the paper feeding cassette 3 to the conveyance path 9A one by one. The image forming device 6 is provided in the middle portion of the conveyance path 9A, and forms a toner image on the conveyed paper P. The fixing device 7 is provided on the downstream side portion of the conveyance path 9A, and thermally fixes the toner image to the paper P.

On the conveyance path 9A, a pair of registration rollers 10 for temporarily blocking the conveyed paper P and correcting the skew of the paper P (skew correction) is provided. An inversion conveyance path 9B is provided below the conveyance path 9A, which branches from the downstream portion of the conveyance path 9A and merges with the upstream portion of the conveyance path 9A. On the inversion conveyance path 9B, a plurality of pairs of conveying rollers 10B for conveying the paper P is provided.

The image forming device 6 includes a toner container 11, a drum unit 12, and an optical scanner 13. The toner container 11 is disposed in the front upper portion in the apparatus main body 2, and contains, for example, black toner (developer). The drum unit 12 includes a photosensitive drum 14, a charging device 15, a developing device 16, and a transfer roller 17. The photosensitive drum 14 is formed in a substantially cylindrical shape, and is driven to be rotated around an axis by a motor (not shown). The charging device 15, the developing device 16 and the transfer roller 17 are arranged around the photosensitive drum 14 in the order of the image forming process. The transfer roller 17 is in contact with the photosensitive drum 14 from the lower side to form a transfer nip. The optical scanner 13 is provided above the photosensitive drum 14, and emits scanning light toward the surface of the photosensitive drum 14.

The image forming apparatus 1 is provided with a control device 8 for controlling the entire apparatus. The control device 8 may be configured by a processor or a logic circuit (hardware) formed in an integrated circuit or the like. In the case of a processor, various processes are performed by the processor reading and executing programs stored in memory. For example, a CPU (Central Processing Unit) is used as the processor. The memory is composed of one or a plurality of storage devices such as ROM (Read Only Memory) and RAM (Random Access Memory) according to the application.

[Image Forming Process] The operation of the image forming apparatus 1 will be described. A control device (not shown) for controlling the image forming apparatus 1 performs the image forming process based on image data input from an external terminal as follows.

The charging device 15 charges the surface of the photosensitive drum 14, and the optical scanner 13 emits the scanning light based on the image data to form an electrostatic latent image on the photosensitive drum 14. The developing device 16 develops the electrostatic latent image to a toner image on the photosensitive drum 14 by using the toner supplied from the toner container 11. The paper feeding device 5 feeds the paper P one by one from the paper feeding cassette 3 to the conveyance path 9A. The paper P is conveyed along the conveyance path 9A, the skew of the paper P is corrected by the pair of registration rollers 10A, and then the paper P enters the transfer nip. The transfer roller 17 transfers the toner image on the photosensitive drum 14 to the surface of the paper P passing through the transfer nip. The fixing device 7 thermally fixes the toner image to the paper P. In the case of single-sided printing, the paper P which has passed through the fixing device 7 is discharged to the paper discharge tray 4.

In the case of double-sided printing, the paper P which has passed through the fixing device 7 is switched back at the downstream end of the conveyance path 9A, and sent to the inversion conveyance path 9B. The paper P is conveyed by the pairs of conveying rollers 10B, returned from the inversion conveyance path 9B to the conveyance path 9A again, and sent to the transfer nip after the skew correction by the pair of registration rollers 10A. Thereafter, the toner image is transferred to the paper P, thermally fixed, and the double-sided printed paper P is discharged to the paper discharge tray 4.

Figure 2:
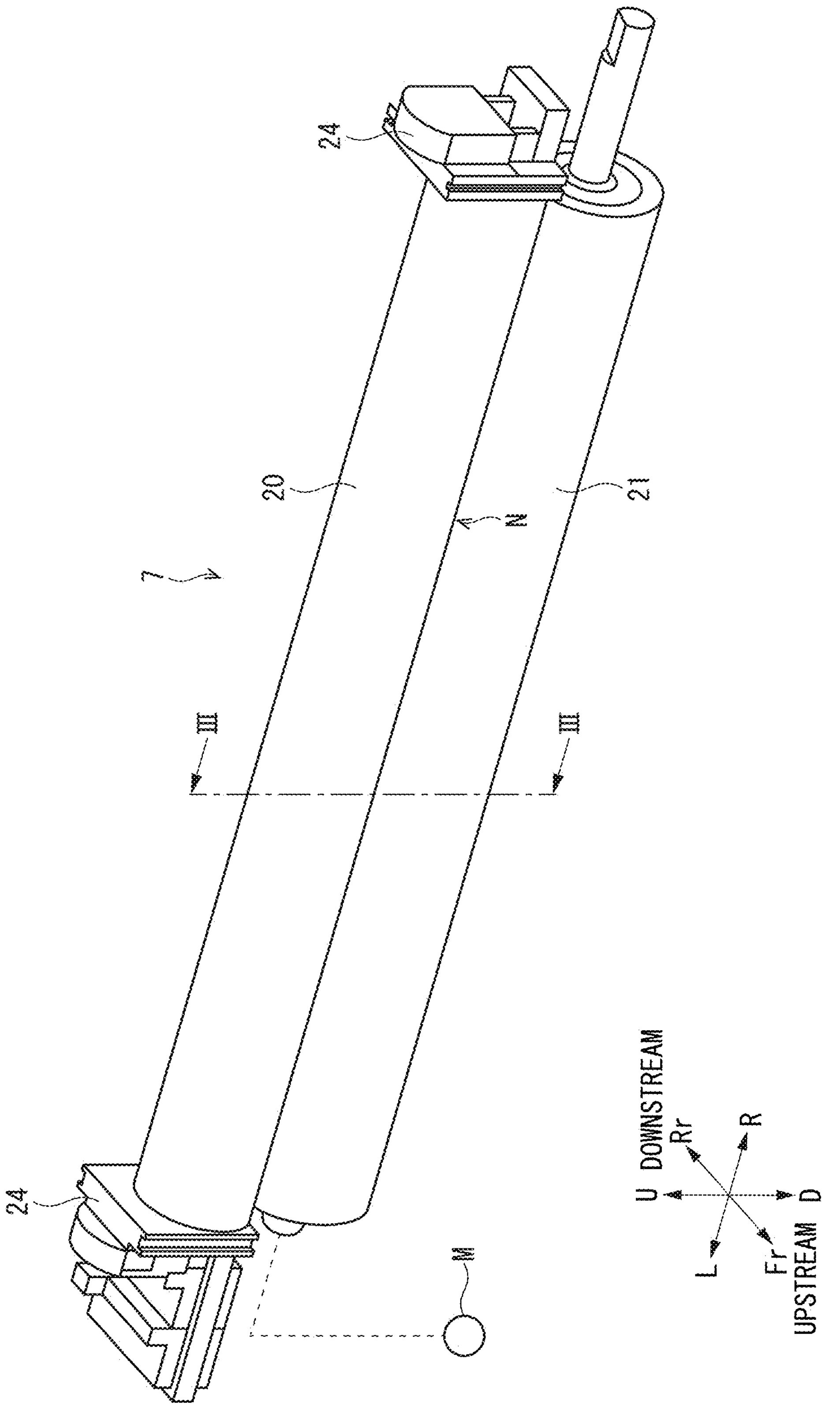
FIG. 2 is a perspective view showing a fixing device according to the embodiment of the present disclosure.
Figure 3:
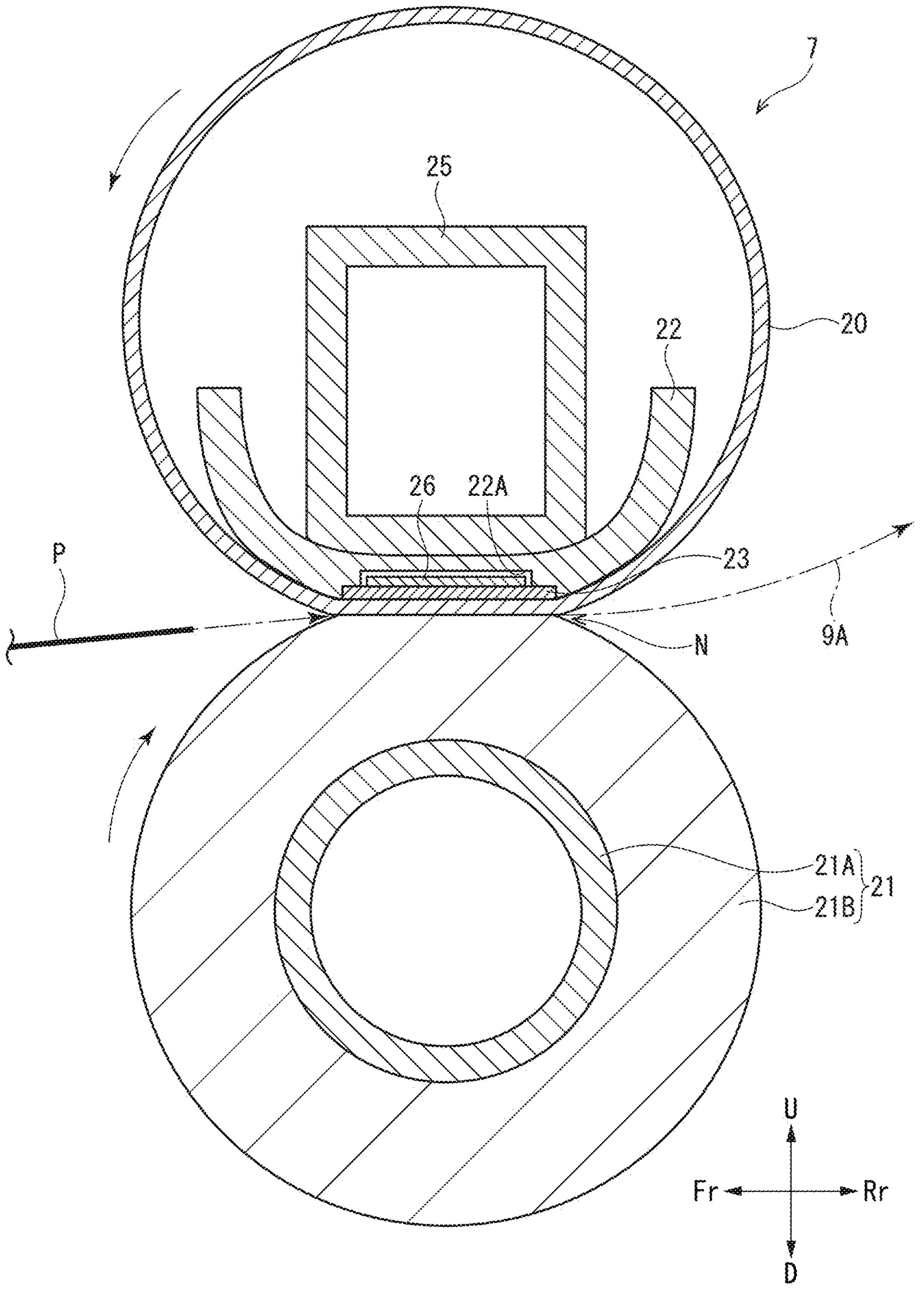
FIG. 3 is a cross-sectional view taken along the line III-III of FIG. 2.
Figure 4:
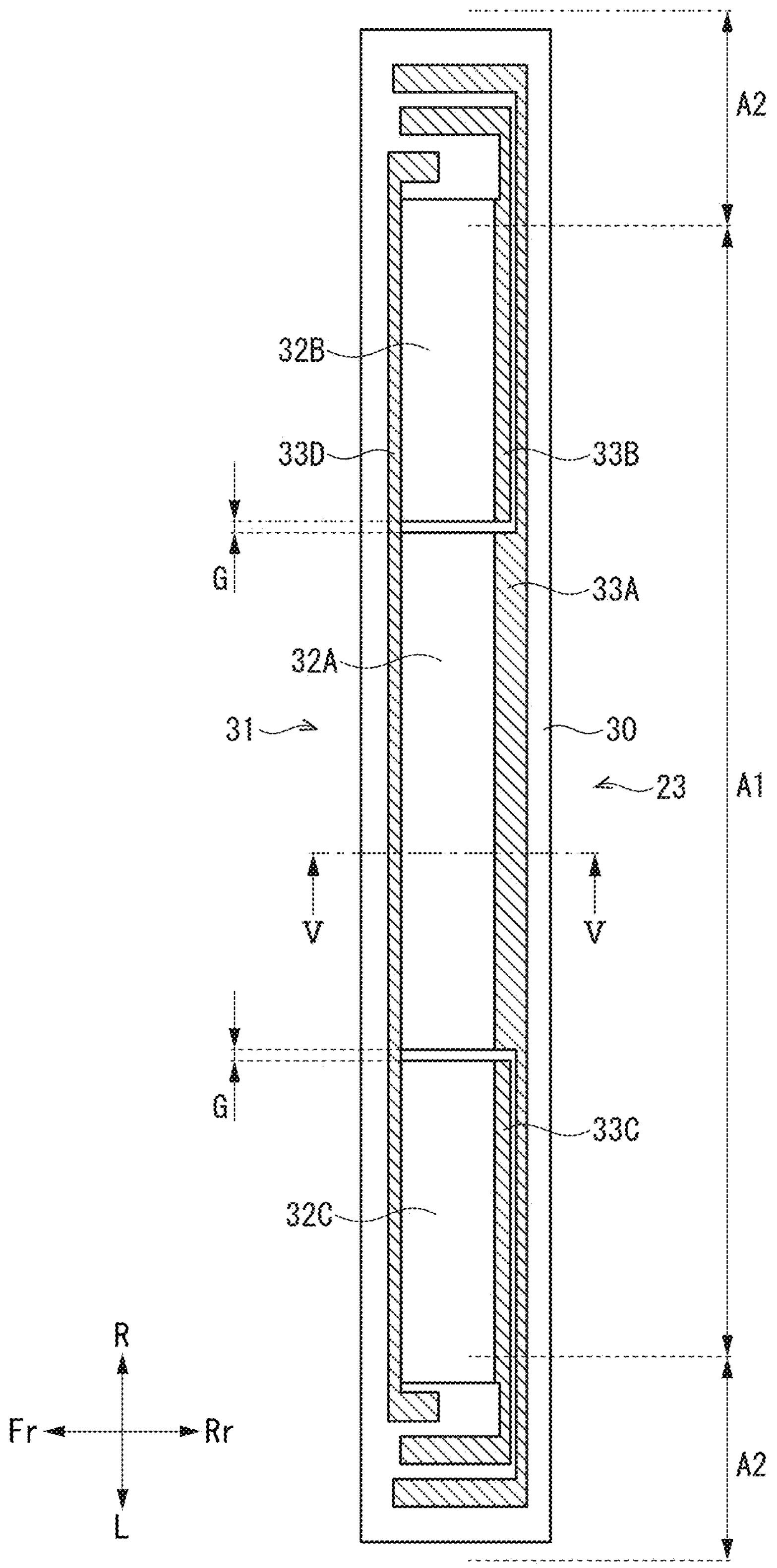
FIG. 4 is a bottom view schematically showing a heater of the fixing device according to the embodiment of the present disclosure.
Figure 5:
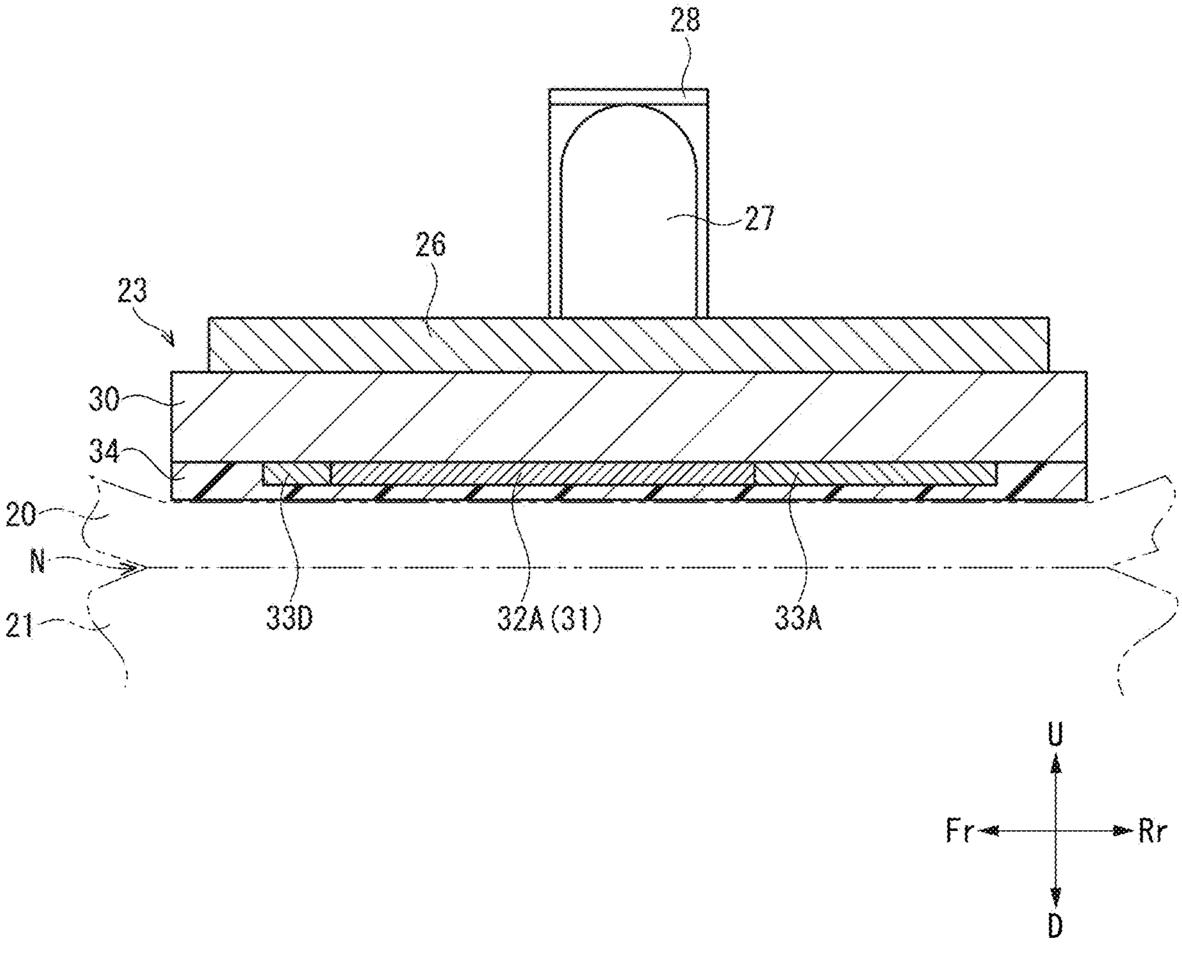
FIG. 5 is a cross-sectional view taken along the line V-V of FIG. 4.
Figure 6:
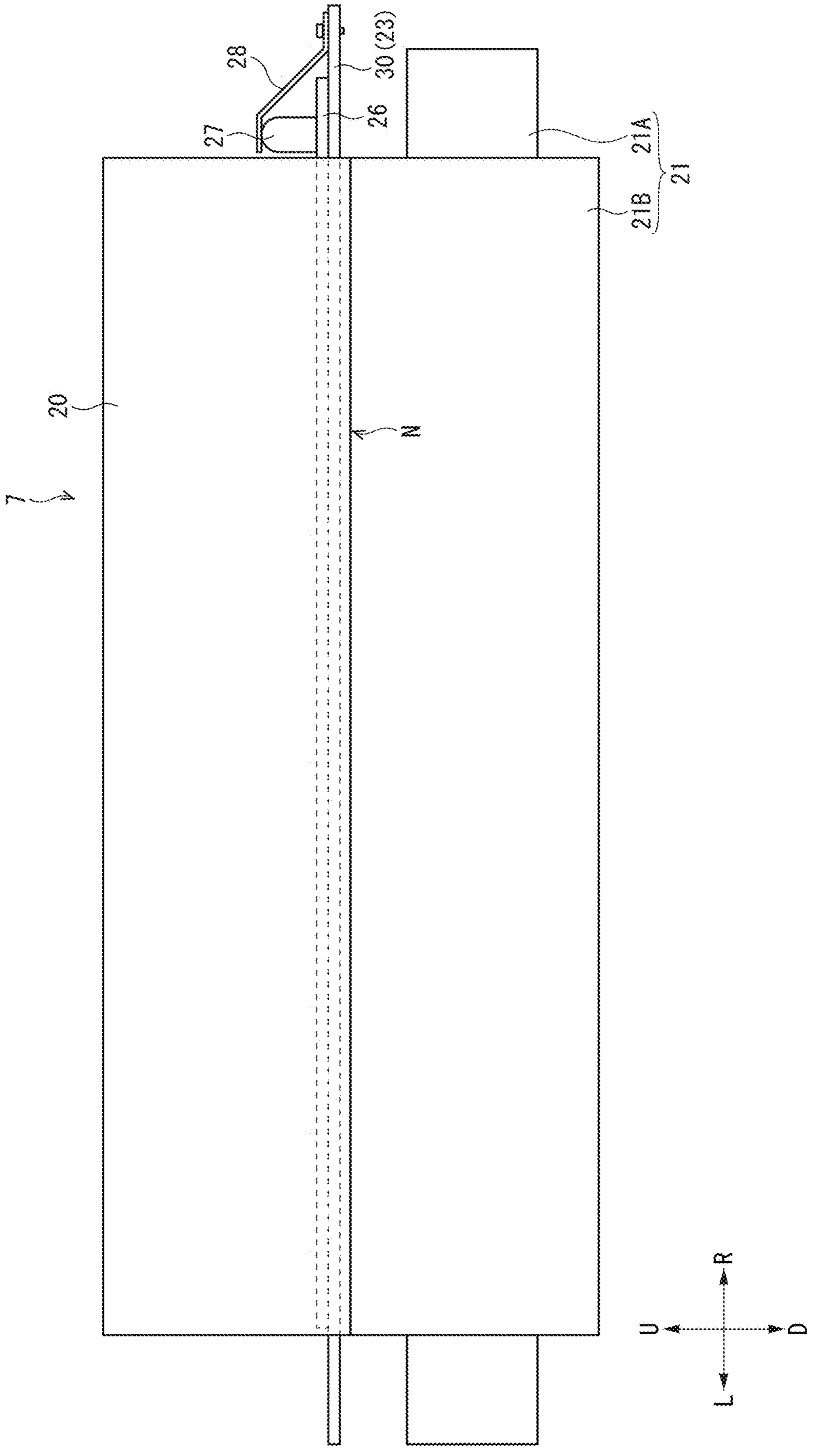
FIG. 6 is a front view showing the fixing device according to the embodiment of the present disclosure.

[Fixing Device] With reference to FIG. 2 to FIG. 6, the fixing device 7 will be described in detail. FIG. 2 is a perspective view showing the fixing device 7. FIG. 3 is a cross-sectional view taken along the line III-III of FIG. 2. FIG. 4 is a bottom view showing a heater 23. FIG. 5 is a cross-sectional view taken along the line V-V of FIG. 4. FIG. 6 is a front view showing the fixing device 7.

The fixing device 7 includes a fixing belt 20, a pressing roller 21, a heater 23, a heat equalizing member, and a temperature detection part 27. The fixing belt 20 and the pressing roller 21 are supported by a frame (not shown), and the frame is fixed to the apparatus main body 2.

<Fixing Belt> The fixing belt 20 is an endless belt formed in a substantially cylindrical shape elongated in the left-and-right direction (axial direction). The fixing belt 20 is made of material having heat resistance and flexibility (polymer resin or metal, or combination of polymer resin and metal). A pair of holding members 24 (see FIG. 2) are inserted into both right and left ends of the fixing belt 20. The pair of holding members 24 guide the fixing belt 20 rotatably around an axis while holding the fixing belt in a substantially cylindrical shape. The fixing belt 20 is supported by the frame via the pair of holding members 24 (not shown).

As shown in FIG. 3, a support member 25 and a heater holder 22 are provided in a space surrounded by the fixing belt 20. The support member 25 is made of, for example, metallic material such as stainless steel, is formed in a substantially rectangular cylindrical shape elongated in the left-and-right (axial) direction, and is provided between the holding members 24. The heater holder 22 is fixed to the lower portion of the support member 25. The heater holder 22 is made of, for example, synthetic resin having heat resistance and wear resistance, and formed in a substantially semi-cylindrical shape elongated in the left-and-right direction. The heater holder 22 is curved along the inner surface of the fixing belt 20, and is in contact with the lower side inner surface of the fixing belt 20 (the pressure region N side inner surface). A fitting portion 22A into which the heater 23 is fitted is recessed in the lower portion of the heater holder 22.

<Pressing Roller> As shown in FIG. 2 and FIG. 3, the pressing roller 21 as an example of the pressing member is formed in a substantially cylindrical shape elongated in the left-and-right direction. The pressing roller 21 includes a metal core 21A and an elastic layer 21B such as a silicon sponge laminated on the outer circumferential surface of the metal core 21A (see FIG. 3). A drive motor M is connected to the left end of the metal core 21A via a gear train (not shown) (see FIG. 2). The pressing roller 21 comes into contact with the fixing belt 20 from the lower side, and forms a pressure region N between the fixing belt 20 and the pressing roller 21. The pressure region N refers to a region from an upstream position where the pressure is 0 Pa to a downstream position where the pressure becomes 0 Pa again via a position where the pressure acts.

The paper P is conveyed such that the center of the width in the left-and-right direction substantially coincides with the center of the pressure region N in the left-and-right direction (axial direction). For this reason, in the fixing belt 20 (or the pressure region N), a passing region A1 which is a center region in the axial direction and is in contact with the paper P, and non-passing regions A2 which are both outer regions in the axial direction and is not in contact with the paper P (see FIG. 4). The paper P to be conveyed always comes into contact with the vicinity of the center portion of the passing region A1 in the axial direction, regardless of a size (dimension in the left-and-right direction) of the paper P. On the other hand, the paper P of a normal size (for example, A4 size) is in contact with both the outer portions on the outer sides of the passing region A1 in the axial direction, but the paper P of a small size (for example, A5 size, B5 size) is not in contact with both the outer portions.

<Heater> As shown in FIG. 3 and FIG. 4, the heater 23 extends in the left-and-right direction (axial direction) of the fixing belt 20, and is fitted into the fitting portion 22A of the heater holder 22. The heater 23 comes into contact with the inner surface of the fixing belt 20 facing the pressure region N, and heats the fixing belt 20. As shown in FIG. 4 and FIG. 5, the heater 23 includes a base board 30 and a heat generating part 31.

(Base Board) The base board 30 is made of insulator (electrical insulating material) such as ceramic, for example. The base board 30 is formed in a substantially rectangular plate shape extending in the left-and-right direction (axial direction) corresponding to the fixing belt 20. As shown in FIG. 6, the base board 30 is formed longer in the left-and-right direction (axial direction) than the fixing belt 20, penetrates the fixing belt 20 in the axial direction, and extends outward from both ends of the fixing belt 20 in the axial direction. That is, both end portions of the base board 30 (heater 23) in the axial direction are exposed to the outside from the fixing belt 20 in the axial direction.

(Heating Part) The heat generating part 31 is provided on the lower surface of the base board 30 which is on the inner surface side of the fixing belt 20 (see FIG. 5). As shown in FIG. 4, the heat generating part 31 includes three resistance heating elements 32A to 32C arranged in a line in the left-and-right direction (axial direction) via gaps G. In the description common to the three resistance heating elements 32A to 32C in this specification, only arithmetic numeral is attached to the reference numerals. The gap G is set to an insulation distance (creeping distance) capable of preventing creeping discharge between the adjacent resistance heating elements 32.

The resistance heating element 32 is made of metal material having a high electrical resistance, and formed in a substantially rectangular shape. The entire heat generating part 31 is formed to be shorter than the full length of the fixing belt 20 in the left-and-right direction (axial direction) and longer than the passing region A1 of the fixing belt 20 in the axial direction (see FIG. 4). In other words, the outer end portions of the resistance heating elements 32B, 32C located on both outer sides in the axial direction face the non-passing regions A2 of the fixing belt 20 (see FIG. 4). A width of the resistance heating element 32A disposed in the center in the axial direction corresponds to a width of the small size paper P in the left-and-right direction, and a width of all the resistance heating elements 32A to 32C correspond to a width of the normal size paper P in the left-and-right direction.

Three individual electrodes 33A to 33C and a common electrode 33D are formed on the lower surface of the base board 30. The three individual electrodes 33A to 33C and the common electrode 33D are made of, for example, metal material having a lower electrical resistance value than the resistance heating element 32. In this specification, the description common to the three individual electrodes 33A to 33C and the common electrode 33D is simply referred to as the "electrode 33", and only arithmetic numeral is attached to the reference numerals.

As shown in FIG. 4, the individual electrode 33A is connected to the downstream end (rear end) of the resistance heating element 32A located at the center in the axial direction. The other individual electrodes 33B, 33C are connected to the downstream ends of the resistance heating elements 32B, 32C, respectively. The common electrode 33D is connected to the upstream ends (front ends) of all the resistance heating elements 32A to 32C. Each of the electrodes 33 extends from the portion connected to the heat generating part 31 to both outer sides of the heat generating part 31 in the axial direction. The electrodes 33 are electrically connected to a device (not shown) such as a power source, on both the outer sides of the base board 30 in the axial direction.

The heat generating part 31 and the electrodes 33 are covered with a coating layer 34 (see FIG. 5). The coating layer 34 is made of, for example, material such as ceramic having electrical insulation and having a small sliding friction force with respect to the inner surface of the fixing belt 20. The coating layer 34, the heat generating part 31, and the electrodes 33 can be formed on the base board 30 with high accuracy by, for example, a film forming technique such as sputtering, a printed circuit board manufacturing technique, a screen printing technique, or a combination of these techniques.

The heater 23 is fitted into the fitting portion 22A of the heater holder 22 with the heat generating part 31 (coating layer 34) facing the pressing roller 21, and the coating layer 34 is brought into contact with the inner surface of the fixing belt 20 (see FIG. 5). When the heater 23 receives the fixing belt 20 pressed against the pressing roller 21, the pressure region N is formed at a contact portion between the fixing belt 20 and the pressing roller 21.

<Heat Equalizing Member> Incidentally, since the fixing belt 20 has a smaller heat capacity than a roller or the like, the fixing device 7 employing the fixing belt 20 has an advantage that the warm-up time is shortened. However, for example, when the paper P of a small size is continuously subjected to the fixing process, excessive temperature rise can be suppressed in most of the passing region A1 of the fixing belt 20 because the paper P (toner image) absorbs heat, but excessive temperature rise may occur in both the axial outer end portions of the passing region A1 and the non-passing regions A2 where the paper P does not pass. Therefore, in the fixing device 7 according to the present embodiment, the heat equalizing member 26 is provided in the heater 23 in order to suppress the excessive temperature rise in the non-passing region A2 or the like of the fixing belt 20.

The heat equalizing member 26 is made of metal material such as an aluminum alloy. The heat equalizing member 26 is formed in a substantially rectangular plate shape extending in the axial direction corresponding to the fixing belt 20. As shown in FIG. 5 and FIG. 6, the heat equalizing member 26 is provided on (in contact with) the upper surface (one surface) of the heater 23 (base board 30) which is opposite to the fixing belt 20 (pressure region N). The heat equalizing member 26 is formed to be shorter in the axial direction than the base board 30 and longer in the axial direction than the fixing belt 20 (heat generating part 31). As shown in FIG. 6, the heat equalizing member 26 penetrates the fixing belt 20 in the axial direction, and extends outward from one axial end side (for example, right side) of the fixing belt 20. The heat equalizing member 26 is disposed to cover the three resistance heating elements 32A to 32C, and exposes the axial right end portion to the outside of the fixing belt 20 in the axial direction.

Lubricant (not shown) such as silicon grease is applied between the heat equalizing member 26 and the base board 30. The lubricant brings the heat equalizing member 26 and the base board 30 into close contact, and facilitates the transfer of heat of the heater 23 to the heat equalizing member 26. The heat equalizing member 26 absorbs the heat emitted from the heater 23 and moves it in the axial direction. That is, the heat equalizing member 26 equalizes a temperature of the heater 23 in the axial direction. As a result, a temperature of the fixing belt 20 is also made uniform in the axial direction, and excessive temperature rise of the non-passing region A2 is suppressed. In the present specification, the term "uniform" does not mean only a state of being completely constant, but a slight difference is allowed.

[Operation of Fixing Device] Here, the operation (fixing process) of the fixing device 7 will be described. As will be described later in detail, the fixing device 7 is provided with the temperature detection part 27 which detects a temperature of the heater 23. The heater 23, the temperature detection part 27, and the drive motor M are electrically connected to the control device 8 and a power source (not shown). The control device 8 appropriately controls the power source and the heater 23.

The control device 8 controls the drive motor M to rotate the pressing roller 21 around the axis. The fixing belt 20 rotates in accordance with the pressing roller 21 (see the arrow in FIG. 2). The control device 8 receives a detection signal from the temperature detection part 27, and controls the heater 23 (or the power source) so as to maintain a predetermined target temperature. The heater 23 (heat generating part 31) generates heat by being energized and heats the fixing belt 20 (pressure region N).

At this time, the control device 8 changes the three resistance heating elements 32A to 32C to be heated (energized) according to a size of the paper P. For example, when the paper P of a normal size passes through the pressure region N, the control device 8 performs control to heat all three resistance heating elements 32A to 32C. When the paper P of a small size passes through the pressure region N, the control device 8 performs control for heating one resistance heating element 32A. Thus, only a necessary portion of the fixing belt 20 (pressure region N) can be heated in accordance with the size of the paper P. As a result, the power used can be kept to a minimum. It is also possible to suppress excessive temperature rise at both outer end portions of the fixing belt 20 in the axial direction.

When a temperature of the fixing belt 20 (heater 23) reaches the target temperature, the control device 8 starts the image forming process already described. The paper P on which the toner image is transferred enters the pressure region N. The fixing belt 20 heats the toner (toner image) on the paper P passing through the pressure region N while rotating around the axis. The pressing roller 21 pressurizes the toner on the paper P passing through the pressure region N while rotating around the axis. Then, the toner image is fixed to the paper P, and a fixed image is formed on the paper P. The paper P on which the image is fixed is discharged to the paper discharge tray 4.

Incidentally, the temperature detection part 27 which detects the temperature of the heater 23 may be disposed in a space surrounded by the fixing belt 20. For example, when the temperature detection part 27 may be provided on substantially the axial center of the upper surface of the heat equalizing member 26, the large fitting portion 22A must be formed in the heater holder 22 in consideration of the arrangement of the temperature detection part 27, thereby increasing the size of the heater holder 22. Accordingly, the diameter of the fixing belt 20 must be increased, and there is a problem of increasing the size of the fixing device 7. Further, when the temperature detection part 27 may be disposed so as to be wrapped in the fixing belt 20, it is easily affected by the temperature of the space in the fixing belt 20, and there is a possibility that a proper temperature of the heater 23 cannot be detected. Therefore, the fixing device 7 according to the present embodiment has a structure for properly detecting a temperature of the heater 23 while reducing the diameter of the fixing belt 20.

<Temperature Detection Part> The temperature detection part 27 is disposed outside the fixing belt 20 and adjacent to the outer end of the fixing belt 20 in the axial direction (see FIG. 6). As shown in FIG. 5 and FIG. 6, the temperature detection part 27 is in contact with the upper surface (one surface) of the heat equalizing member 26 on the opposite side of the heater 23. More specifically, the temperature detection part 27 is provided so as to come into contact with the heat equalizing member 26 (its right upper surface) exposed from the fixing belt 20. The temperature detection part 27 is, for example, a heat-sensitive element such as a thermal-cut, and detects a temperature of the heater 23 via the heat equalizing member 26, and cuts off power supply to the heater 23 when the detected temperature is abnormal.

The temperature detection part 27 is fixed to the base board 30 via an attachment member 28. The attachment member 28 is a plate spring made of metal material such as stainless steel, for example, and is provided in a cantilever manner with one end attached to the heater 23. One end portion (right end portion) of the attachment member 28 is attached to the heater 23 (base board 30) exposed from the fixing belt 20 via a screw. The attachment member 28 extends upward and leftward while tilting from the right end portion, and the other end portion (left end portion) of the attachment member 28 is in contact with the upper surface of the temperature detection part 27 (see FIG. 6). The other end portion of the attachment member 28 is brought into contact with the temperature detection part 27, and the temperature detection part 27 is pressed against the heat equalizing member 26. One end portion of the attachment member 28 may not be attached using the screw, and may be attached to the base board 30 via, for example, an adhesive.

In the fixing device 7 according to the present embodiment described above, one axial end portions of the heater 23 and the heat equalizing member 26 are disposed so as to be exposed to the outside from the fixing belt 20 in the axial direction, and the temperature detection part 27 is disposed so as to be in contact with the heat equalizing member 26 exposed from the fixing belt 20. According to this configuration, since the temperature detection part 27 is disposed outside the fixing belt 20 in the axial direction, a diameter (outer diameter) of the fixing belt 20 can be reduced (a curvature can be increased) as compared with the case where the temperature detection part 27 is disposed in the space surrounded by the fixing belt 20. Further, since the temperature detection part 27 is disposed outside the fixing belt 20 in the axial direction, it is hardly affected by the temperature in the space inside the fixing belt 20. Thus, the temperature of the heater 23 can be properly detected while reducing the diameter of the fixing belt 20 and, consequently, the size of the fixing device 7.

Further, according to the fixing device 7 according to the present embodiment, since the temperature detection part 27 is pressed against the heat equalizing member 26 by the attachment member 28, the temperature of the heater 23 can be properly detected via the heat equalizing member 26.

In order to properly thermally fix the toner to the paper P, it is required that the surface of the fixing belt 20 be set to a proper temperature (target temperature). Therefore, it is preferable that the temperature detection part 27 directly detects a temperature of the surface of the fixing belt 20, and the heater 23 is controlled (power source control) based on the detection result. However, since it is difficult to bring the temperature detection part 27 into contact with the surface of the rotating fixing belt 20, the temperature detection part 27 detects the temperature of the heater 23 and controls the heater 23 based on the detection result. In other words, the temperature of the surface of the fixing belt 20 is estimated (predicted) from the temperature of the heater 23. If the temperature detection part 27 is disposed in the space inside the fixing belt 20 or the temperature detection part 27 is greatly separated from the axial right end of the fixing belt 20, the detection result of the temperature detection part 27 greatly deviates from the actual surface temperature of the fixing belt 20, and the surface temperature of the fixing belt 20 may not be accurately estimated (predicted) from the detection result of the temperature detection part 27.

In the fixing device 7 according to the present embodiment, as shown in FIG. 6, the temperature detection part 27 is disposed along the outer axial end of the fixing belt 20 as viewed from the outside (front or rear) (of the fixing belt 20). The left end of the temperature detection part 27 may coincide with the outer axial end of the fixing belt 20, or may be slightly (about a few mm to a dozen mm) away from the outer axial end of the fixing belt 20, as viewed from the outside in the radial direction. According to this configuration, a difference between the detection result (temperature of the heater 23) of the temperature detection part 27 and the surface temperature of the fixing belt 20 can be reduced. Thus, the surface temperature of the fixing belt 20 can be accurately estimated (predicted) based on the detection result of the temperature detection part 27. As a result, the toner can be properly thermally fixed to the paper P.

In the fixing device 7 according to the present embodiment, both the axial end portions of the heater 23 (base board 30) are exposed to the outside from the fixing belt 20 in the axial direction, and one axial end portion (right end portion) of the heat equalizing member 26 is exposed to the outside from the fixing belt 20 in the axial direction, but the present disclosure is not limited thereto. The heater 23 and the heat equalizing member 26 may expose at least one of both axial end portions thereof to the outside of the fixing belt 20 in the axial direction.

Further, in the fixing device 7 according to the present embodiment, one temperature detection part 27 is provided on the right upper surface of the heat equalizing member 26 exposed from the right end of the fixing belt 20, but the present disclosure is not limited thereto. For example, the heat equalizing member 26 may be provided so as to be exposed outward from the axial left end of the fixing belt 20, and one temperature detection part 27 may be provided on the left upper surface of the exposed heat equalizing member 26. Alternatively, the heat equalizing member 26 may be provided so as to be exposed outward from both axial ends of the fixing belt 20, and two temperature detection parts 27 may be provided on the upper surfaces of the axial end portions of the heat equalizing member 26 (not shown). Even in these cases, each temperature detection part 27 may be disposed along the outer end of the fixing belt 20 in the axial direction, as viewed from the outside in the radial direction. When the two temperature detection parts 27 are provided, the control device 8 may calculate the average of the detection results of the two temperature detection parts 27 and control the heater 23 based on the calculation result.

In the fixing device 7 according to the present embodiment, the temperature detection part 27 is attached to the base board 30 via a cantilevered attachment member 28, but the present disclosure is not limited thereto. For example, the intermediate portion of the belt-shaped attachment member may be in contact with the upper surface of the temperature detection part 27, and both end portions of the attachment member may be elastically deformed and attached to the base board 30 (not shown). Alternatively, the attachment member 28 may be omitted and the temperature detection part 27 may be attached to the base board 30 via an adhesive or the like (not shown).

In the fixing device 7 according to the present embodiment, the temperature detection part 27 is a thermal-cut, but is not limited thereto, and may be a contact type temperature sensor such as a thermocouple, a platinum temperature measuring resistor, a thermistor temperature measuring body, or a bimetallic thermometer.

Further, in the fixing device 7 according to the present embodiment, the heat generating part 31 is divided into three resistance heating elements 32A to 32C, but the present disclosure is not limited to this, and the heat generating part 31 may be divided into two, four or more, or not (none of which is shown). In addition, the heat generating part 31 may be a single resistance heating element extending from one side to the other side in the axial direction, or may be a U-shaped resistance heating element extending from one side to the other side in the axial direction and then folded to extend from the other side to one side in the axial direction (not shown).

Further, in the fixing device 7 according to the present embodiment, the paper P passes through the center of the pressure region N in the axial direction, but it is not limited to this, and the paper P may pass through a position closer to one outer end side of the pressure region N in the axial direction (not shown). In this case, the non-passing region A2 is set only on the other outer end side in the axial direction of the fixing belt 20 (or the pressure region N).

In the fixing device 7 according to the present embodiment, although the pressing roller 21 is rotationally driven and the fixing belt 20 is driven to be rotated, the fixing belt 20 may be rotationally driven and the pressing roller 21 may be driven to be rotated.

In the description of the above-described embodiment, the present disclosure is applied to the monochrome image forming apparatus 1 as an example, but the present disclosure is not limited thereto, and may be applied to, for example, a color printer, a copying machine, a facsimile machine, or a multifunction machine.

It should be noted that the description of the above embodiments shows one aspect of the fixing device and the image forming apparatus according to the present disclosure, and the technical range of the present disclosure is not limited to the above embodiments. The present disclosure may be varied, replaced, and modified without departing from the spirit of the technical thought, and the scope of the claims includes all embodiments which may be included within the scope of the technical thought.

The invention claimed is:

1. A fixing device comprising:

a fixing belt formed in a cylindrical shape and rotating around an axis to heat a toner on a medium;

a pressing member forming a pressure region with the fixing belt and pressurizing the toner on the medium passing through the pressure region while rotating around an axis;

a heater extending in an axial direction of the fixing belt, coming into contact with an inner surface of the fixing belt facing the pressure region, and heating the fixing belt;

a heat equalizing member extending in the axial direction, coming into contact with one surface of the heater opposite to the fixing belt, absorbing heat emitted from the heater and moving the heat in the axial direction; and a temperature detection part which is in contact with one surface of the heat equalizing member opposite to the heater and detects a temperature of the heater via the heat equalizing member, wherein at least one of end portions of the heater and the heat equalizing member in the axial direction is exposed to an outside of the fixing belt in the axial direction, and the temperature detection part is provided in contact with the heat equalizing member exposed from the fixing belt.

2. The fixing device according to claim 1, wherein the temperature detection part is disposed along an outer end of the fixing belt in the axial direction as viewed from an outside in a radial direction.

3. The fixing device according to claim 1, comprising:

an attachment member, wherein one end of the attachment member is attached to the heater exposed from the fixing belt, and the other end of the attachment member is brought into contact with the temperature detection part to press the temperature detection part against the heat equalizing member.

4. An image forming apparatus comprising the fixing device according to claim 1.

* * * * *